United States Patent [19]

Tu

[11] 4,250,059
[45] Feb. 10, 1981

[54] CATALYTIC COMPOSITE, METHOD OF MANUFACTURE

[75] Inventor: Hosheng Tu, Shorewood, Ill.

[73] Assignee: UOP Inc., Des Plaines, Ill.

[21] Appl. No.: 69,684

[22] Filed: Aug. 27, 1979

[51] Int. Cl.$^3$ .............................................. B01J 29/18
[52] U.S. Cl. ................................................ 252/455 Z
[58] Field of Search ................................... 252/455 Z

[56] References Cited

U.S. PATENT DOCUMENTS

| | | | |
|---|---|---|---|
| 3,326,818 | 6/1967 | Gladrow et al. | 252/455 Z |
| 4,039,479 | 8/1977 | Gembicki et al. | 252/455 Z |
| 4,107,086 | 8/1978 | Michalko | 252/455 Z |

Primary Examiner—Carl F. Dees
Attorney, Agent, or Firm—James R. Hoatson, Jr.; Thomas K. McBride; William H. Page, II

[57] ABSTRACT

This invention provides a catalytic composite prepared by calcining a zeolite of the mordenite crystal structure containing less than about 5 wt. % sodium as $Na_2O$ in admixture with a refractory inorganic oxide and an ammonium salt, the method of manufacturing the catalytic composite.

20 Claims, No Drawings

CATALYTIC COMPOSITE, METHOD OF MANUFACTURE

BACKGROUND OF THE INVENTION

1. Field of the Invention

The field of art to which this invention pertains is catalytic composites, methods of their manufacture, and the use thereof. More specifically, the claimed invention relates to a catalytic composite comprising a calcined mixture of a zeolitic crystalline aluminosilicate, a refractory inorganic oxide, and an ammonium salt, a method of preparing the catalytic composite by calcining a zeolite of the mordenite crystal structure in admixture with a refractory inorganic oxide and an ammonium salt, and a method of using the aforesaid catalytic composite in treating sour petroleum distillates.

2. Description of the Prior Art

Crystalline aluminosilicates, or zeolites, of which mordenite is one example, are well known in the art and have found extensive application as hydrocarbon conversion catalysts or as a component thereof. Such materials are of ordered crystalline structure often visualized as a three-dimensional network of fundamental structural units consisting of silicon-centered $SiO_4$ and aluminum-centered $AlO_4$ tetrahedra, the tetrahedra being interconnected by a mutual sharing of apical oxygen atoms and arranged to form cages or cavities in open communication through smaller intracrystalline channels of pore openings whose narrowest cross section has essentially a uniform diameter characteristic of each crystalline aluminosilicate variety. To effect a chemical balance, each $AlO_4$ tetrahedra has a cation associated therewith--usually a sodium or other exchangeable cation. The aforementioned cages or cavities are occupied by water molecules and by the last mentioned cations, both of which exhibit considerable freedom of movement permitting ion-exchange and reversable dehydration.

The crystalline aluminosilicates, or zeolites, employed in the manufacture of the catalytic composite of this invention, are of the mordenite crystal structure, highly siliceous in nature and generally characterized by a silica-alumina mole ratio of from about 6 to about 12 as found in nature. The mordenite crystal structure comprises four- and five-membered rings of the $SiO_4$ and $AlO_4$ tetrahedra so arranged that the crystal lattice comprises pores and channels running parallel along the crystal axis to give a tubular configuration. This structure is unique among the crystalline aluminosilicates since the channels of tubes do not intersect, and access to the cages or cavities is in only one direction. For this reason, the mordenite structure is frequently referred to as two-dimensional. This is in contrast to other well-known crystalline aluminosilicates, for example faujasite, in which the cavities can be entered from three directions. Mordenite, clinoptilolite, or mordenite which has been synthesized or acid extracted, caustic extracted or otherwise treated to increase the silica-alumina mole ratio to about 20:1 or more while maintaining the mordenite crystal structure, may be used in the manufacture of the catalytic composite of this invention.

Crystalline aluminosilicate having a mordenite crystal structure have heretofore been utilized composited with a refractory inorganic oxide, typically alumina, as a hydrocarbon conversion catalyst, and are particularly useful with respect to the transalkylation of alkylaromatic hydrocarbons. It is an object of this invention to present a new and useful method of manufacture providing a novel catalytic composite of improved activity, especially useful in the treatment of sour petroleum distillates.

Catalysts manufactured simply by compositing a crystalline aluminosilicate having a mordenite crystalline structure with a refractory inorganic oxide typically have been of relatively low activity. The prior art reveals that methods of manufacturing catalysts of improved activity have required steps in addition to a simple composite step, often involving the use of hazardous chemicals.

The prior art discloses that in preparing a catalytic composite comprising a crystalline aluminosilicate having a mordenite crystalline structure containing less than about 5 wt. % sodium as $Na_2O$ and a refractory inorganic oxide, activity of the catalytic composite may be increased by the addition during compositing of a peptizing agent such as nitric acid. The prior art also discloses that a catalytic composite of improved activity can be prepared by subjecting the crystalline aluminosilicate to an aqueous ammoniacal treatment at a pH of at least 9.5 prior to admixture with the refractory inorganic oxide and addition of the peptizing agent. U.S. Pat. No. 4,107,086. The prior art further discloses that another method of improving catalyst activity comprises the addition during compositing of a certain quantity of a metal salt convertible at calcination conditions to the refractory metal oxide composited with the crystalline aluminosilicate, and subjecting either the crystalline aluminosilicate prior to compositing or the resulting composite to an aqueous ammoniacal treatment at a pH of at least 9.5. U.S. Pat. No. 4,039,479.

What has been needed, but not shown by the foregoing prior art, is a catalytic composite with activity comparable to or superior to that of the prior art which can be manufactured conveniently and less expensively in fewer steps. Such a catalytic composite has been accomplished in the present invention. Whereas the prior art requires that a strong acid peptizing agent by used in the manufacture of active catalytic composites of mordenite and a refractory inorganic oxide, the catalytic composite of this invention is of superior activity and yet can be prepared without a peptizing agent, using instead a neutral ammonium salt. Thus the use of hazardous peptizing agent chemicals can be avoided. The ammonium salt admixed in the preparation of the catalytic composite of this invention can be in any form, including powder or aqueous solution. Thus, there exits inherently greater flexibility in the manufacture of the catalytic composite of this invention as opposed to prior art catalytic composites which require liquid solutions of peptizing agents. Further, the preparation of the catalytic composite of this invention requires fewer steps than the preparation of catalytic composites disclosed in the foregoing references, since no aqueous ammoniacal treatment of the mordenite or the resulting catalytic composite is required.

SUMMARY OF THE INVENTION

The catalytic composite of this invention does not require a peptizing agent or aqueous ammoniacal treatment in either its preparation or its use.

The invention is in one embodiment a method of manufacturing a catalytic composite which comprises calcining a zeolite of the mordenite crystal structure containing less than about 5 wt. % sodium as Na$_2$O, in admixture with a refractory inorganic oxide and an ammonium salt.

In another embodiment, the invention is a catalytic composite prepared by the foregoing method.

Another embodiment of the invention is a method for treating a sour petroleum distillate which comprises oxidizing mercaptans contained in the distillate by contacting the distillate with a catalytic and an oxidizing agent in the presence of an alkali metal hydroxide, the catalytic composite having been prepared by calcining a zeolite of the mordenite crystal structure containing less than about 5 wt. % sodium as Na$_2$O, in admixture with a refractory inorganic oxide and an ammonium salt.

One of the more specific embodiments relates to a method of manufacturing a catalytic composite which comprises calcining mordenite containing less than about 5 wt % sodium as Na$_2$O, in admixture with alumina and ammonium nitrate.

Other objects and embodiments of this invention will become apparent in the following detailed description.

DESCRIPTION OF THE INVENTION

Pursuant to the present invention the zeolite is admixed with the refractory inorganic oxide and the ammonium salt and thereafter calcined. Ammonium chloride, ammonium sulfate and ammonium phosphate are preferred ammonium salts. Especially preferred is ammonium nitrate. The ammonium salt may be in any form, such as aqueous solution. The preferred form to enhance the satisfactory admixture is a powder. The ammonium salt is believed to act as a promoter of the desired interaction of the zeolite and the refractory inorganic oxide. It is also believed that the ammonium salt interacts with the aluminum constituents of the zeolite to foster acid sites necessary for an active catalyst. It appears that during calcination the ammonium salt melts. The molten ammonium salt is believed to diffuse throughout the admixture and to locate at the interface of the zeolite and the refractory inorganic oxide. Calcination is believed to accomplish the thermal decomposition of the ammonium salt thereby promoting the association of resulting hydrogen ions with aluminum ions of the zeolite. The calcination can be performed in an air environment at atmospheric pressure. The particular calcination temperature which results in a catalytic composite of the desired activity depends on the physical properties of the particular ammonium salt selected and can be determined by conventional laboratory techniques without undue experimentation. Suitable temperatures for calcination range from about 425° C. to about 750° C. More preferable are temperatures in the range of from about 475° C. to about 550° C. The period of time during which calcination should be conducted ranges from about one-half hour to about ten hours.

The crystalline aluminosilicate, or zeolite, employed herein as a starting material should contain, or should be treated to contain, less than about 5 wt. % sodium calculated as Na$_2$O. The sodium can be reduced to an acceptable level by conventional and widely practiced ion-exchange techniques. Typically, ammonium cations are exchanged for sodium cations on treating the zeolite in contact with the aqueous ammonium salt solution, for example an aqueous ammonium chloride solution. The resulting ammonium-exchanged zeolite is thereafter heat-treated to effect thermal decomposition of the ammonium cations and formation of the hydrogen form of the zeolite. In any case, the treatment may be effected one or more times to reduce the sodium content to less than about 5 wt. % calculated as Na$_2$O.

Refractory inorganic oxides for use in accordance with the method of this invention include the naturally occurring as well as the synthetically prepared refractory inorganic oxides. Suitable refractory inorganic oxides are such as alumina, silica, zirconia, titania, thoria, boria, magnesia, chromia, stannic oxide, and the like, as well as combinations and composites thereof, for example, alumina-silica, alumina-zirconia, alumina-titania, etc. Alumina is a preferred refractory inorganic oxide for use herein, particularly with respect to the manufacture of a catalytic composite for use in the transalkylation of alkylaromatic hydrocarbons. The alumina may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like, the first mentioned alpha-alumina monohydrate being preferred.

The refractory inorganic oxide and zeolite may be combined in intimate admixture in any conventional or otherwise convenient manner to form spheres, pills, pellets, granules, extrudates, or other suitable particle shape. For example, the ammonium salt and the zeolite can be admixed with a metal salt subsequently converted to the refractory inorganic oxide to provide intimate admixture. The method is described in greater detail in U.S. Pat. No. 4,039,479. Alternatively, finely divided zeolite and the ammonium salt can be dispersed in an alumina sol, and the mixture in turn dispersed as droplets in a hot oil bath whereby gelation occurs with the formation of spheroidal gel particles. The method is described in greater detail in U.S. Pat. No. 2,620,314.

A more preferred method comprises commingling a finely divided form of the selected zeolite, refractory inorganic oxide and the ammonium salt with a binder and/or lubricant or with deionized water and compressing the mixture into pills or pellets of uniform size and shape as is the common practice. Alternatively, and still more preferably, the zeolite, refractory inorganic oxide and ammonium salt are combined and admixed with deionized water in a mix-muller. The resulting dough can be pressured through a die or orifice of predetermined size to form extrudate particles which can be dried and calcined and utilized as such, or formed into spheres by means of a spinning disc or drum and then dried and calcined. Spheroidal particles are also suitably prepared by the method whereby the finely divided zeolite, refractory inorganic oxide and ammonium salt particles are dry-mixed and discharged into contact with deionized water on a rotating inclined pan or disc to effect agglomerative spheroidizing of said particles, the resulting spheres being subsequently dried and calcined. The zeolite is preferably calcined in intimate admixture with the selected refractory inorganic oxide and ammonium salt in a ratio to provide a final composite comprising said zeolite and refractory inorganic oxide in a weight ratio of from about 1:3 to about 3:1. The ammonium salt is preferably admixed with the zeolite in a weight ratio of from about 1:100 to about 1:10.

The catalytic composite of this invention is particularly useful for the transalkylation of alkylaromatic hydrocarbons. Thus, an alkyl-aromatic hydrocarbon having from about 7 to about 15 carbon atoms per molecule is treated at transalkylation conditions including a temperature of from about 200° C. to about 480° C. and a pressure of from about atmospheric to about 1500 pounds per square inch gauge (psig) in contact with a catalyst comprising essentially the catalytic composite of this invention to form products of higher and lower number of carbon atoms than said alkylaromatic hydrocarbon. The preferred composition employed as the catalytic composite comprises mordenite in admixture with alumina, said mordenite comprising from about 25 to about 75 wt. % of said composite.

The alkylaromatic hydrocarbon feed stock can be a substantially pure alkylaromatic hydrocarbon of from about 7 to about 15 carbon atoms, a mixture of such alkylaromatic hydrocarbons, or a hydrocarbon fraction rich in said alkylaromatics. Suitable alkylaromatic hydrocarbons include alkylbenzenes and alkylnaphthalenes, preferably with an alkyl group of less than about 4 carbon atoms. The catalytic composite is particularly effective in the treatment of the more difficultly transalkylatable toluene to form benzene, xylenes, or other polymethylbenzenes.

The transalkylation, or disproportionation, reaction can be effected in contact with the catalytic composite of this invention in any conventional or otherwise convenient manner and may comprise a batch or continuous type of operation. A preferred type of operation is of the continuous type. For example, the above described catalyst is disposed in a fixed bed to a vertical tubular reactor and the alkylaromatic feed stock charged in an upflow or downflow manner, the reaction zone being maintained at a temperature of from about 200° C. to about 480° C., preferably at a temperature of from about 220° C. to about 460° C. Although pressure does appear to be an important variable with respect to the transalkylation reaction of this invention, the process is generally conducted in the presence of an imposed hydrogen pressure to provide from about 1 to about 100 moles of hydrogen per mole of hydrocarbon. However, there is no net consumption of hydrogen in the process, and the hydrogen charge is recovered from the reactor effluent and recycled.

The transalkylation reaction can be effected over a wide range of space velocities. In general, the process is conducted at a space velocity of from about 0.2 to about 10. Space velocities herein referred to are liquid hourly space velocities. (LHSV) i.e., volume of charge per volume of catalyst per hour. While the catalytic composite prepared by the present method permits unusually high space velocities indicative of high activity, the catalytic composite is particularly noteworthy because of its relatively high stability at a high activity level.

The composite perpared in accordance with the method of this invention may be employed as a component of a catalyst comprising any of the several catalytically active metallic materials in the oxidized or reduced state. Of particular interest are those catalytic composites comprising one or more metals of Group VIB and VIII including molybdenum, tungsten, chromium, iron, nickel, cobalt, platinum, palladium, ruthenium, rhodium, osmium and iridium. Thus, the composite of this invention can be utilized advantageously as a catalyst or component thereof to effect a variety of hydrocarbon conversion reactions involving reaction conditions comprising a temperature in the 25°-760° C. range. The catalysts are particularly useful in effecting the hydrocracking of heavy oils, including vacuum residuals, to form petroleum product in the middle distillate range utilizing a temperature of from about 260° C. to about 560° C. and pressures of from about 500 to about 1000 psig. Said hydrocarbon conversion reactions further include polymerization of olefins, particularly ethylene, propylene, 1-butene, isobutylene and also higher boiling olefins, at polymerizaton reaction conditions. The composite of this invention is also useful as a catalyst or component thereof in effecting the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, and higher boiling olefins, including nonenes, decenes, undecenes, etc., the foregoing alkylation reactions being effected at alkylation conditions disclosed in the art. The composite of this invention is further useful in the isomerization of paraffins, particularly n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methyl pentane to 2,2- and 2,3-dimethylbutane, isomerization of naphthenes, for example the isomerization of dimethylcyclopentane to methylcyclohexane, isomerization of methylcyclopentane to cyclohexane, etc., at isomerization reaction conditions. Other hydrocarbon conversion reactions including the reforming of naphtha to gasoline, dehydrogenation of benzene to cyclohexane, are effectively catalyzed utilizing the composite of this invention as a catalyst or as a component thereof.

The following examples are presented in illustration of certain preferred embodiments of this invention and are not intended as an undue limitation on the generally broad scope of the invention as set out in the appended claims.

EXAMPLE I

In this example, a catalytic composite of mordenite and alumina was prepared using a peptizing agent. Twenty pounds of commercial mordenite (H Zeolon) containing about 0.02 wt. % sodium as $Na_2O$ and 14 wt. % volatile matter, as measured by weight loss on ignition at 900° C., was thoroughly mixed with twenty-five pounds of commercial alpha-alumina monohydrate (Catapal Medium) containing about 29% volatile matter. Approximately nineteen pounds of a peptizing agent consisting of a 5.5 wt. % nitric acid solution in water was admixed therewith in a continuous mixer. The resulting dough was extruded through a 0.059 inch die. The extrudate was calcined in air in a belt calciner at 300° F. for one hour and thereafter at 900° F. for two hours.

EXAMPLE II

In this example, a catalytic composite of mordenite and alumina was prepared without a peptizing agent in accordance with one preferred embodiment of this invention. Fifteen pounds of a commercial mordenite (H Zeolon) containing about 0.20 wt. % sodium as $Na_2O$ and 14 wt. % volatile matter, as evidenced by weight loss on ignition at 900° C., was thoroughly mixed with eighteen pounds of a commercial alpha-alumina monohydrate (Catapal Medium) containing about 29% volatile matter, and 1.14 pounds of crystallized ammonium nitrate. Approximately fourteen pounds of deionized water was admixed therewith in a continuous mixer. The resulting dough was extruded through a 0.059 inch die. The extrudate was calcined in air by gradually raising the calcination temperature from 75° F. to 300° F. over a one hour period and thereafter raising the calcination temperature from 300° F. to 900° F. over a two hour period.

EXAMPLE III

In this example, the catalytic composites of Example I and Example II were evaluated with respect to the transalkylation of toluene. In each case toluene, in admixture with hydrogen to provide a hydrogen/hydrocarbon mole ratio of about 55, was charged downflow through a 100 cubic centimeter bed of catalyst particles of approximately 0.05 inch at a liquid hourly space velocity of 1.20 at transalkylation conditions including a pressure of 400 psig. The temperature of the catalyst bed was adjusted to effect a 40% conversion of toluene feedstock, the temperature in each case being taken as a measure of catalyst activity.

To effect a 40% conversion of toluene feedstock a temperature of 833° F. was required for the catalytic composite produced by the method of Example I. The catalytic composite of Example II required a temperature of only 812° F. The difference in temperature, 21° F., is a measure of the difference in activities of the two catalytic composites.

It is apparent with reference to the foregoing examples that a substantially more active catalytic composite is produced when an ammonium salt is admixed with mordenite and a refractory inorganic oxide than when a strong acid peptizing agent, such as nitric acid, is used. Further, it can be seen that since no aqueous ammoniacal treatment is required of the catalytic composite of this invention, fewer steps can be used in its preparation.

I claim as my invention:

1. A method of preparing a catalytic composite which comprises calcining a zeolite of the mordenite crystal structure containing less than about 5 wt. % sodium as $Na_2O$, in admixture with a refractory inorganic oxide and an ammonium salt selected from the group consisting of ammonium chloride, sulfate and phosphate.

2. The method of claim 1 wherein said zeolite and said refractory inorganic oxide are in a weight ratio of from about 1:3 to about 3:1.

3. The method of claim 1 wherein said zeolite and said refractory inorganic oxide are in a weight ratio of from about 1:3 to about 3:1 and said zeolite and said ammonium salt are in a weight ratio of about 100:1 to about 10:1.

4. The method of claim 1 wherein said zeolite is mordenite.

5. The method of claim 1 wherein said zeolite is clinoptilolite.

6. The method of claim 1 wherein said refractory inorganic oxide is alumina.

7. The method of claim 1 wherein said refractory inorganic oxide is an alpha-alumina monohydrate.

8. The method of claim 1 wherein said ammonium salt is ammonium chloride.

9. The method of claim 1 wherein said calcining is effected at a temperature of from about 425° C. to about 750° C.

10. The method of claim 1 wherein said calcining is effected at a temperature of from about 475° C. to about 550° C.

11. A catalyst prepared by the method of claim 1.
12. A catalyst prepared by the method of claim 2.
13. A catalyst prepared by the method of claim 3.
14. A catalyst prepared by the method of claim 4.
15. A catalyst prepared by the method of claim 5.
16. A catalyst prepared by the method of claim 6.
17. A catalyst prepared by the method of claim 7.
18. A catalyst prepared by the method of claim 8.
19. A catalyst prepared by the method of claim 9.
20. A catalyst prepared by the method of claim 10.

* * * * *